Figure 2:
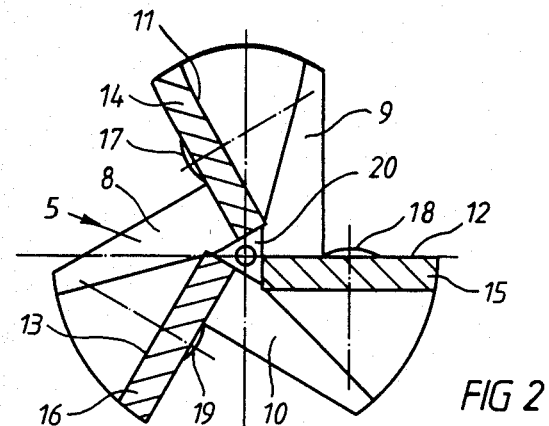

United States Patent [19]

Heule

[11] Patent Number: 4,710,072

[45] Date of Patent: Dec. 1, 1987

[54] CONE DRILL BIT

[76] Inventor: Heinrich Heule, Kristallstrasse 6, Au, Switzerland, 9434

[21] Appl. No.: 617,560

[22] Filed: Jun. 5, 1984

[30] Foreign Application Priority Data

Jun. 10, 1983 [DE] Fed. Rep. of Germany ....... 3321110

[51] Int. Cl.$^4$ ............................................. B23B 51/00
[52] U.S. Cl. .................................... 408/18; 408/83.5; 408/227
[58] Field of Search ............... 408/227, 233, 187, 188, 408/713, 238, 239, 241 R, 225, 224, 86, 83.5, 18; 407/40, 41, 42

[56] References Cited

U.S. PATENT DOCUMENTS

| 989,119 | 4/1911 | Clouse | 408/227 |
| 1,127,175 | 2/1915 | Brooks | 408/233 |
| 1,592,092 | 7/1926 | Forster | 408/83.5 |
| 1,825,007 | 9/1931 | McNaught | 408/83.5 |
| 2,041,587 | 5/1936 | Beard | 408/83.5 |
| 4,293,254 | 10/1981 | Markovics | 407/40 X |

Primary Examiner—Z. R. Bilinsky
Attorney, Agent, or Firm—Paul H. Gallagher

[57] ABSTRACT

The countersink to form a conical chamfer at the mouth of a bore hole has a conical chamfering head, on which three separate cutting plates are arranged, symmetrically, the cutting plates being fastened to the chamfering head, but removable and changeable. A compatible sharpening device permits the introduction and mounting of the cutting plates, wherein the sharpening device has the same form or shape as the countersink, so that it is easy to resharpen the cutting plates to their original specifications.

5 Claims, 8 Drawing Figures

CONE DRILL BIT

The invention refers to a chamfering tool according to the main idea of patent claim 1.

In the case of three-lipped chamferers up to the present, the cutting blades were not removable, but permanently attached to the chamfering head, by soldering or brazing. Because of wear of the cutting edges, the entire chamferer had to be sharpened, which until now has been possible only with specialized and relatively expensive machines, in order to attain the specific relief behind the cutting surfaces. In that case, where the purchase of this sort of sharpening machine for most enterprises is too expensive, the ordinary chamferer is sent out of house, and a relatively long time is required before that kind of chamferer is useful again. The present day chamferer can, moreover, only be re-ground one time, and after the cutting edges are completely worn, the entire tool must be discarded.

The present invention is directed to overcome such problem, the device having the cutting surfaces arranged on separate cutting plates, and the cutting plates being fastened to the cutting head, and removable and interchangeable.

In the employment of interchangeable cutting plates on a three-lipped chamferer, there is also the essential advantage that any cutting plate can be interchanged with another at will, thus substituting one for another, wherein the case of a worn cutter that is not possible to be sharpened, only the cutting plate need be changed. The tool body itself must no longer be discarded.

The cutting plates are therefore made of high speed steel or tang-tun and easily changeable. It therefore produces a burr- and chatter-free job, when held in the hand, or in programmable machine use, and on a large chamfer area.

The large chamfer area is produced by a symmetrically sloping opening angle, so that for instance the first production form of chamfering tool according to the invention covers an average area of 2–25 mm, a second production form, an average area of 4–45 mm, and a third production form, an average area of 6–85 mm.

To re-sharpen, the cutting plates are removed from the tool and placed in a sharpening device, which looks essentially like the chamfering tool. By this means, the original shape and conformity are retained, in the course of which the cutter is re-sharpened on a conventional grinder or sharpening device (the spindle head offset at 45°).

The inventor's object of the foregoing invention proceeds not only from the subject of a sole patent claim, but also from the combination of the several patent claims themselves.

The fundamental features, declarations and characteristics, as shown and described, are new as opposed to the present state of the art.

In the following, the invention at hand is more precisely clarified by the descriptive drawings than by mere explanation.

Figure 1:
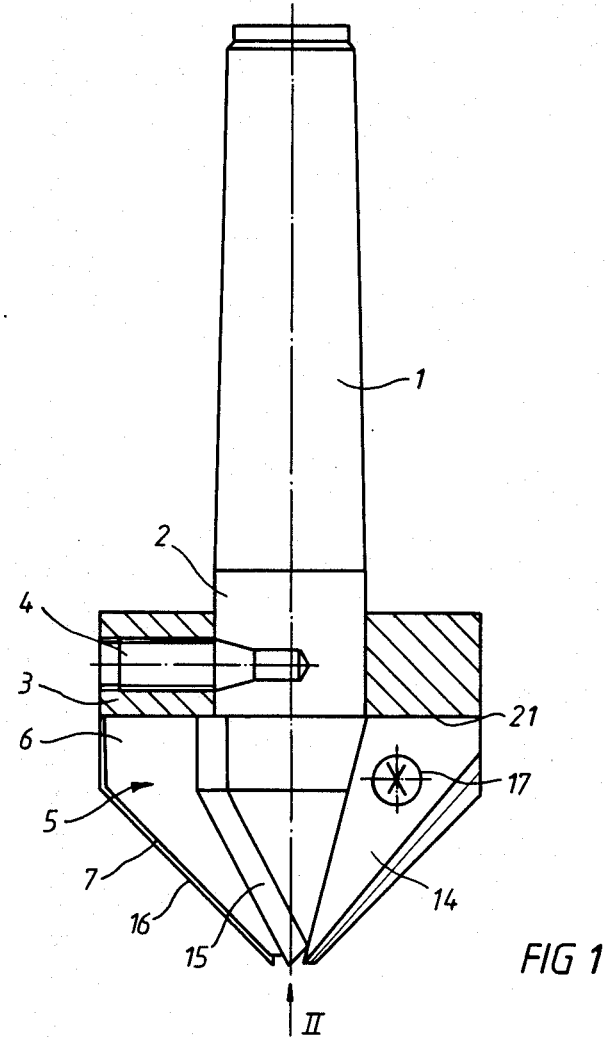

Shown:

FIG. 1: Side view, partially in section, of a chamfering tool according to the invention.

FIG. 2: Face view of chamfering tool, as viewed from II in FIG. 1.

Figure 3:
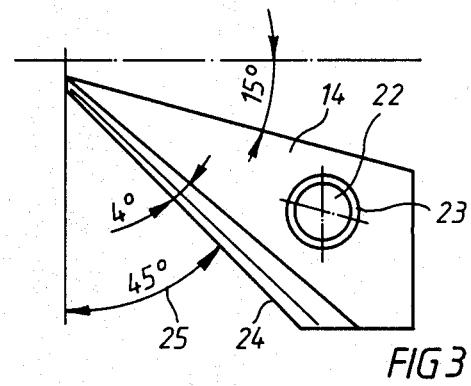

FIG. 3: Side view of a cutting plate.

Figure 4:
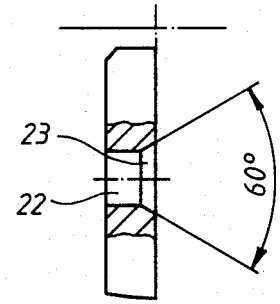

FIG. 4: Sectional view of the cutting plate of FIG. 3, showing the top portion of the fastening hole.

Figure 5:
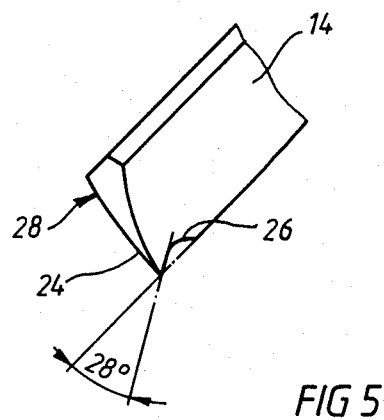

FIG. 5: Perspective side view of a cutting plate, according to FIGS. 3 and 4.

Figure 6:
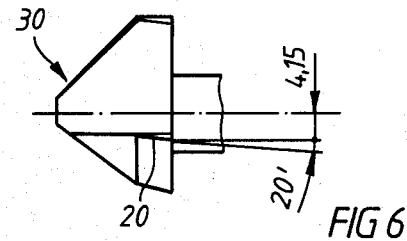

FIG. 6: Side view of a sharpening device to resharpen the cutting plate of the chamfering tool.

Figure 7:
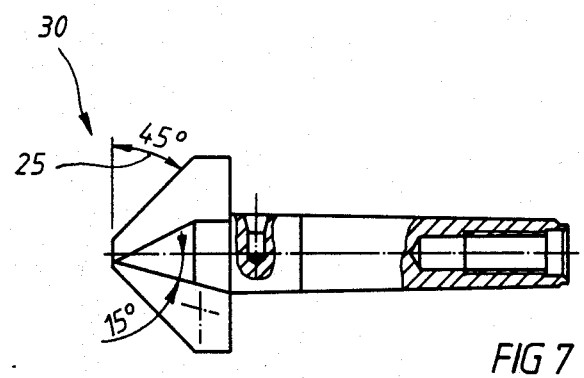

FIG. 7: Side view of the entire sharpening device.

Figure 8:
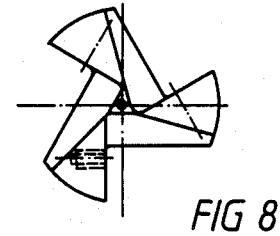

FIG. 8: Face view of the sharpening device of FIGS. 6 and 7.

The chamfering tool consists of a main body 1 which is conical, so that it can be held in a chuck. Instead of the conical main body, obviously other pieces or articles of work can be accepted by such a chuck.

The tapered main body 1 leads into the top of a cylindrical body 2 on which an attachment ring 3 is connected to the body 2 with a threaded pin 4. The threaded pin 4 has a 30° conical taper to provide a snug, no-play fastening of the attachment ring 3 to the tapered main body. The cylindrical body 2 is integrated with a chamfering head 5, just as the body 2 is integrated with the main body 1.

The main body 1, body 2 and chamfering head 5 are thus a single, continuous part. The chamfering head 5 has a cylindrical extension 6, which leads into a chamfer cutting cone or plate 7. The chamfering head 5 with its chamfer cutting cone or plate 7 (chamfer angle 90°) is shaped with respectively staggered attachment surfaces 8, 9, 10 staggered respectively at 120°, on whose lateral attachment surfaces 11, 12, 13 the cutting plates 14, 15, 16 are fastened by means of set screws 17, 18, 19. Every cutting cone or plate lies outside of an inner attachment member 20, with its inner face against the attachment member 20, which is shaped in a triangular section, and which is integral with the main body of the tool.

Additionally, the knives are adjacent to the lower attachment surface 21 of the chamfering head 5.

The set screws 17, 18, 19 likewise have a conically tapered head so that the cutting plates 14, 15, 16 may be drawn up and locked tightly in exact position against the innerlying radial bearing surfaces of the attachment member 20, as well as against the attaching surfaces 11, 12, 13 of the attachment surface 21. Hereby, an absolutely tight seat is provided, free from play or drifting of the cutting plates 14, 15, 16 on the chamfering head 5. The attachment surface 21 is hereby brought against the attachment ring 3, which is connected by means of the threaded pin 4 with the body 2. FIG. 3 shows a side view of a cutting plate 14.

As may be seen here, a hole 22 with a chamfered entrance 23 is provided into which the set screw 17 is screwed. The chamfer 23 with its angle of 60° ensures that the cutting plates 14, 15, 16 are strongly fastened against the above-described fastening surfaces.

The essential point in FIG. 3 is that the 45° included angle seen as position 25, can be changed as may be desired, that is, for example, it can be changed to a 30° angle. By this means, such a cutting plate may be installed in another chamferer and a correspondingly different chamfer angle will be produced.

Without going further, a quick change of tool for a different chamfer angle is possible, so long as another chamfering head with a matching cutting cone 7 is at hand for arrangement.

Further, it is apparent that the rear surface of the cutting plate 14 which faces on the attaching body 20 surface has an angle of 15° from the horizontal as shown in FIG. 3. By this means an improved transfer of torque force to the chamfering tool is ensured.

The angle of 4° in FIG. 3 is the augmentation of the shaving angle.

FIG. 5 shows the front side of a cutting plate 14. The cutting edge 24 is visible, behind which is a chip step, or rake. The shaving angle is 28°. The sharpening device for a chamfering tool such as the one under discussion is represented in FIGS. 6–8. The sharpening device is distinguished in that it appears much like the chamfering tool, except that the bearing surfaces on the attachment member 20 are placed 20 min. and about 0.15 mm to the rear, that is, behind the center, and that an angle of 20 min. inclined to the rear is shown in FIG. 6. The mentioned displacement of 4.15 mm produces the free angle, and the mentioned direction of 20 min. provides the continuous ascent of the free angle.

The sharpening device according to the invention is characterized in that the worn cutting plates 14, 15, 16 of a chamfering tool according to FIGS. 1–5 are removed and placed in the sharpening device according to FIGS. 6–8.

The sharpening device according to FIG. 7 is then turned over the half-chamfer angle 25 and brought against an abrasive wheel. The surface of the chamfering cone 7 then stands exactly perpendicular to the face of the abrasive wheel, and a simple grinding operation is performed until the cutting plates are properly re-sharpened. With this device the free angle 28 is re-ground. The angle relationship of the chip rake 26 as described in FIG. 5 will not be affected by this.

It is important that the free angle 28 be ground in the simple manner described, an undercut or underground not being necessary, as it was in previously-known three-lipped countersinks when re-ground. There follows such a simple grinding procedure which is very brief. Thereby it is possible, with this sharpening device 30 at hand to re-grind the cutting plates 14, 15, 16 to their original form in one's own premises, thereby rendering them re-usable.

I claim:

1. A chamfering tool for cutting a conical chamfer in the rim of a bore hole, and having a central main longitudinal axis, comprising, a main body and a conical chamfering head integral therewith, the chamfering head having a plurality of recesses distributed around said main longitudinal axis, and each including a pair of flat surfaces extending axially, and tangent to base circles, and directed horizontally in generally circumferential direction, said recesses disposed at less than 180°, but not less than 90°, relative to each other about the axis, each recess being without confining surfaces radially outwardly of said pair of surfaces thereby presenting a generally concave recess directed radially outwardly, a plurality of cutting plates separate from said integral body and head, one in each of said recesses and bearing against both of said surfaces in the recesses, and means detachably securing the cutting plates in said recesses, the securing means constituting the sole means confining the cutting plates against said surfaces.

2. A chamfering tool according to claim 1 wherein, the recesses and cutting plates are three in number and distributed at 120° apart around said longitudinal axis.

3. A chamfering tool according to claim 2 wherein, the chamfering head includes a central attachment member triangular in cross section, which forms one of said surfaces in each of said recesses.

4. A chamfering tool according to claim 3 wherein, the surfaces of the cutting plates which abut the central attachment member, and the corresponding surfaces of the attachment member, are inclined at 15° angle to said main longitudinal axis.

5. A chamfering tool according to claim 1, in conjunction with a sharpening device that is in the design of the chamfering tool, wherein, the cutting plate, in the sharpening device attached to the attachment member is inclined at 20' of angle trailing in feed direction, and extends a predetermined distance radially outwardly from said central longitudinal axis.

* * * * *